(12) United States Patent
Coleman et al.

(10) Patent No.: US 9,821,426 B2
(45) Date of Patent: Nov. 21, 2017

(54) APPARATUS FOR ADDING AN ADDITIONAL ROTATION AXIS TO A MULTI-AXIS TOOLING MACHINE

(71) Applicants: Christopher Art Coleman, Lakeland, TN (US); Brian Joseph Underwood, Olive Branch, MS (US)

(72) Inventors: Christopher Art Coleman, Lakeland, TN (US); Brian Joseph Underwood, Olive Branch, MS (US)

(73) Assignee: CADILLAXIS, LLC, Lakeland, TN (US)

( * ) Notice: Subject to any disclaimer, the term of this patent is extended or adjusted under 35 U.S.C. 154(b) by 203 days.

(21) Appl. No.: 14/748,190

(22) Filed: Jun. 23, 2015

(65) Prior Publication Data

US 2016/0375536 A1     Dec. 29, 2016

(51) Int. Cl.
| | |
|---|---|
| *B23Q 16/02* | (2006.01) |
| *B23Q 1/48* | (2006.01) |
| *B23Q 1/54* | (2006.01) |
| *B23Q 1/62* | (2006.01) |

(52) U.S. Cl.
CPC ............. *B23Q 16/02* (2013.01); *B23Q 1/488* (2013.01); *B23Q 1/5406* (2013.01); *B23Q 1/625* (2013.01); *B23Q 2220/004* (2013.01); *Y10T 409/30868* (2015.01); *Y10T 409/305656* (2015.01); *Y10T 409/305824* (2015.01); *Y10T 409/308792* (2015.01)

(58) Field of Classification Search
CPC ... Y10T 409/30868; Y10T 409/308792; Y10T 409/305656; Y10T 409/305824

USPC .................................. 74/813 L, 816, 813 R
See application file for complete search history.

(56) References Cited

U.S. PATENT DOCUMENTS

| | | | | |
|---|---|---|---|---|
| 1,507,488 | A * | 9/1924 | Kraemer ................. | B23Q 3/06 269/285 |
| 2,144,486 | A * | 1/1939 | Erb ......................... | B23Q 1/28 269/67 |
| 3,700,228 | A * | 10/1972 | Peale .................. | B23Q 1/5437 269/57 |
| 4,529,342 | A | 7/1985 | Babel | |

(Continued)

FOREIGN PATENT DOCUMENTS

DE             4114724 A1 * 11/1992  ............... B23Q 1/48

*Primary Examiner* — Daniel Howell
*Assistant Examiner* — Yasir Diab
(74) *Attorney, Agent, or Firm* — Russ Weinzimmer & Associates, PC

(57) ABSTRACT

An apparatus for adding an additional rotational axis in a multi-axis tooling machine is disclosed. The apparatus includes a base unit, an indexer disk, a securement mechanism, and a pointer mechanism. The base unit is supported by the tooling machine, and the indexer disk is supported by the base unit. The indexer disk includes a periphery with a plurality of grooves spaced at radial angles with respect to a rotation axis of the indexer disk. The securement mechanism is adjustable to a fixed state in which it prevents the indexer disk from rotating, and to a released state in which the securement mechanism releases the indexer disk for rotation. The pointer mechanism is disposed at the periphery of the indexer disk for releasable engagement with the plurality of grooves. A method for adding an additional rotation axis to a multi-axis tooling machine is also disclosed.

18 Claims, 8 Drawing Sheets

(56) References Cited

U.S. PATENT DOCUMENTS

| | | | |
|---|---|---|---|
| 4,617,720 A * | 10/1986 | Palfery | B23Q 1/522 409/221 |
| 4,961,268 A | 10/1990 | Xu et al. | |
| 4,999,894 A | 3/1991 | Berry et al. | |
| 5,158,487 A * | 10/1992 | Varnau | B23Q 3/103 269/902 |
| 5,172,464 A * | 12/1992 | Kitamura | B23Q 1/5406 198/346.1 |
| 5,236,292 A | 8/1993 | Loucks, Jr. | |
| 5,802,698 A | 9/1998 | Fitzgerald et al. | |
| 6,254,075 B1 | 7/2001 | Kozima | |
| 6,637,737 B1 | 10/2003 | Beecherl et al. | |
| 7,645,103 B2 * | 1/2010 | Schmidt | B23Q 1/012 269/58 |
| 7,665,197 B2 | 2/2010 | Smolarek | |
| 8,360,408 B2 | 1/2013 | Bereznicki et al. | |
| 9,381,580 B2 * | 7/2016 | Yang | B23C 3/12 |
| 2004/0049902 A1 * | 3/2004 | Hagstrom | B23B 29/04 29/26 A |
| 2005/0108886 A1 | 5/2005 | Trefry | |
| 2005/0139036 A1 * | 6/2005 | Kato | B23Q 1/287 74/813 L |
| 2006/0089089 A1 * | 4/2006 | Kato | B23Q 1/5437 451/23 |
| 2007/0196192 A1 * | 8/2007 | Stein | B23Q 1/01 409/168 |
| 2008/0047120 A1 * | 2/2008 | Soroka | B23Q 1/01 29/27 C |
| 2009/0152823 A1 * | 6/2009 | Bernhardt | B23B 31/16 279/43 |
| 2010/0025907 A1 | 2/2010 | Strahm et al. | |
| 2010/0260569 A1 * | 10/2010 | Ham | B23Q 1/5406 409/80 |
| 2012/0266783 A1 * | 10/2012 | Yoshida | B23Q 1/4857 108/2 |

\* cited by examiner

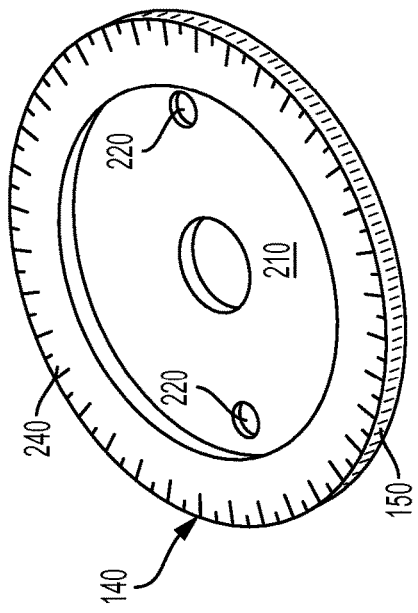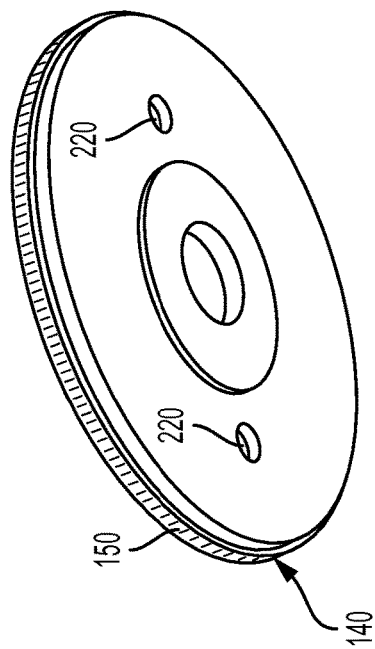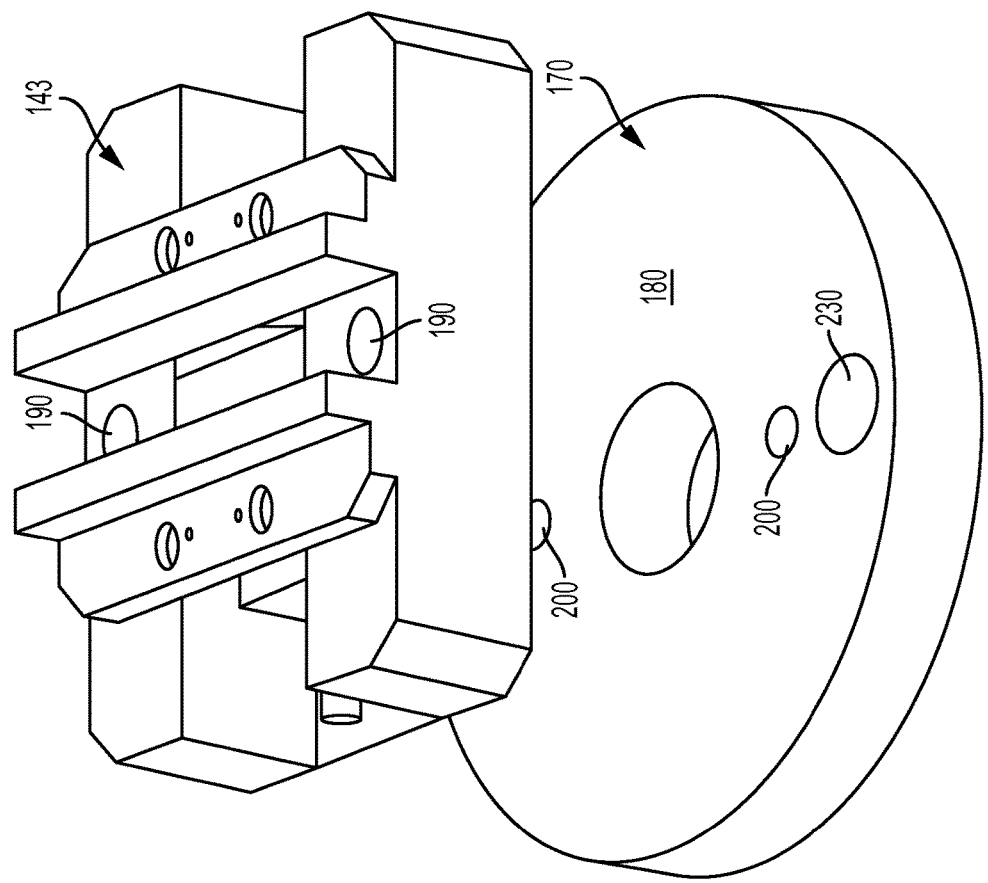

APPARATUS FOR ADDING AN ADDITIONAL ROTATION AXIS TO A MULTI-AXIS TOOLING MACHINE

FIELD

This invention relates generally to tooling machines, and more particularly to multi-axis tooling machines.

BACKGROUND

A wide variety of tooling machines are available for performing drilling and milling operations. In such tooling machines, a tool is used to perform operations on the work piece while the tool and the work piece move with respect one another. In some operations, the tool is moved relative to the work piece, while in other cases, the work piece is moved relative to the tool. This relative motion takes place along and about various axes of the tooling machine, and may be executed manually or using automated computer numeric control (CNC).

The complexity and cost of a tooling machine often depends on the number of axes along which the relative motion takes place. Three-axis tooling machines provide relative linear motion between the tool and the work piece along the x, y, and z-coordinate axes, and are not relatively complex or costly. Four-axis tooling machines provide relative linear motion between the tool and the work piece along the x, y, and z-coordinates, as well as rotation about a horizontal axis. Five-axis tooling machines provide relative motion between the tool and the work piece along an additional rotational axis that is perpendicular to the horizontal rotational axis.

Prior to machining, the work piece holder orients the work piece at a "zero position" corresponding to the initial location at which the machining operations are to begin for a given set of machining operations. To this end, the tooling machine typically has a vice or other work piece holder for fixing the work piece to the tooling machine. Such vices/components are adapted to suit the type of work piece that is to be machined, and to ensure proper orientation and positioning of the work piece during such machining. However, if a work piece is to be machined about an axis of rotation that is not available on the tooling machine, the entire work piece holder may require replacement or reconfiguration to machine the work piece at the desired angle. This may be accomplished, for example by replacing the work piece holder with another type of work piece holder and/or mounting the work piece at a different orientation/angle on the tooling machine using additional components. Often, the work piece is removed during such replacement/reconfiguration, making it difficult to accurately remount the work piece on the work piece holder at a desired location/orientation. Each time the angle of the work piece is adjusted on the tooling machine about an otherwise unavailable rotation axis, the position and angle of the work piece is rechecked, for example, using gauge blocks and other guides. Such reconfiguration and replacement therefore introduces inaccuracies in the machining process, and further, is complex and expensive, thereby leading to idle times for the tooling machine.

SUMMARY

When a work piece is to be machined about an axis of rotation that is not typically available on a multi-axis tooling machine, the invention can be used to provide an additional rotation axis. This additional rotation axis avoids the need to replace or reconfigure the entire work piece holder so as to machine the work piece at a desired angle. Thus, there is no longer a need to replace the work piece holder with another type of work piece holder and/or mounting the work piece at a different orientation/angle on the tooling machine using additional components. Consequently, there is no need to remove the work piece for such replacement/reconfiguration, and therefore there is no need to perform the difficult action of accurately remounting the work piece on the work piece holder at the desired location/orientation. Further, there is no longer a need to recheck the position and angle of the work piece, for example, using gauge blocks and other guides. Thus, many possible inaccuracies in the machining process are avoided, and so are the complexities and expenses due to such reconfiguration and replacement, such as by avoiding idle times for the tooling machine.

A general aspect of the invention is an apparatus for adding an additional rotation axis to a multi-axis tooling machine. The apparatus includes: a base unit configured for support by the multi-axis tooling machine; an indexer disk configured for support by the base unit, the indexer disk including a rotation axis and a periphery having a plurality of grooves spaced at predetermined radial angles with respect to the rotation axis, the predetermined radial angles being marked by visual indicia for use in identifying an angle at which a work piece can be held with respect to the rotation axis; a securement mechanism, the securement mechanism being adjustable to one of a fixed state which prevents the indexer disk from rotating about the rotation axis, and a released state in which the securement mechanism releases the indexer disk for rotation about the rotation axis; and a pointer mechanism disposed at the periphery of the indexer disk for releasable engagement with the plurality of grooves.

In some embodiments, the apparatus further includes an adapter base configured for support by the indexer disk, the adapter base also being configured for attachment to a work piece holder.

In some embodiments, the indexer disk includes an adapter surface configured for attachment to a work piece holder.

In some embodiments, the pointer mechanism includes: a pointer; and a pointer base in a fixed relationship with the base unit, the pointer being movable on the pointer base between a first position in which it is disengaged from the plurality of grooves, and a second position in which it is in fixed engagement with one or more of the plurality of grooves. In further embodiments, the plurality of grooves of the indexer disk are formed as teeth. In still further embodiments, the pointer includes a tip configured to selectively engage one or more of the teeth of the indexer disk. In further embodiments, the pointer is movable with respect to the pointer base along a radial axis that is perpendicular to the rotation axis.

In some embodiments, the securement mechanism includes: a keyed member configured for fixed support by the base unit at a position between the base unit and the indexer disk, the keyed member having an arcuate groove concentrically disposed about and radially displaced from the rotation axis; and a key extending through the indexer disk and into the engagement with the keyed member through the arcuate groove, wherein the key is adjustable with respect to the keyed member to implement the fixed state and released state. In further embodiments, the key is a T-nut engaging a bolt extending through the indexer disk and arcuate groove of the keyed member.

In some embodiments, the plurality of grooves are disposed completely about the periphery of the indexer disk. In further embodiments, the plurality of grooves are disposed at 1° increments about the periphery of the indexer disk.

In some embodiments, the base unit includes sidewalls configured for gripping by a vice of the multi-axis tooling machine.

In some embodiments, the multi-axis tooling machine is a four-axis tooling machine, and the additional rotation axis is a fifth axis of the multi-axis tooling machine.

Another general aspect of the invention is an apparatus for use in a multi-axis tooling machine so as to add an additional rotation axis, apparatus including: an indexer disk having a central portion defining a rotation axis, the indexer disk having a periphery with a plurality of grooves spaced at predetermined radial angles with respect to the rotation axis; an adapter base having a first side disposed within the annular bore of the indexer disk, and a second side configured to engage a work piece holder, wherein the predetermined radial angles of the indexer disk are marked by visual indicia for identifying an angle at which a work piece can be held with respect to the rotation axis by the work piece holder; a keyed member having an arcuate groove concentrically disposed about and radially displaced from the rotation axis; and a key extending through the adapter base, indexer disk, and arcuate groove of the keyed member, wherein the key is adjustable with respect to the keyed member between a fixed state in which the indexer disk and adapter base are secured against movement about the rotation axis, and a released state in which the indexer disk and adapter base are released for co-rotation about the rotation axis; a pointer mechanism disposed at the periphery of the indexer disk for releasable engagement with the plurality of grooves; and a base unit in fixed engagement with the keyed member, wherein the base unit is configured for support by the tooling machine.

In some embodiments, the key includes a T-nut engaging a bolt extending through the adapter base, indexer disk, and arcuate groove of the keyed member.

In some embodiments, the pointer mechanism includes: a pointer; and a pointer base in a fixed relationship with the base unit, wherein the pointer is movable on the pointer base between a first position in which it is disengaged from the plurality of grooves, and a second position in which it is in fixed engagement with at least one of the plurality of grooves. In further embodiments, the plurality of grooves of the indexer disk are formed as teeth, and wherein the pointer includes a tip configured to selectively engage one or more of the teeth of the indexer disk. In further embodiments, the pointer is movable with respect to the pointer base along a radial axis that is perpendicular to the rotation axis.

Yet another general aspect of the invention is an apparatus for adding an additional rotation axis to a multi-axis tooling machine having a base unit for providing a first rotation axis. This apparatus includes: an indexer disk configured for support by the base unit, the indexer disk including a second rotation axis and a periphery having a plurality of grooves spaced at predetermined radial angles with respect to the second rotation axis, the predetermined radial angles being marked by visual indicia for use in identifying an angle at which a work piece can be held with respect to the second rotation axis; a securement mechanism, the securement mechanism being adjustable to one of a fixed state which prevents the indexer disk from rotating about the second rotation axis, and a released state in which the securement mechanism releases the indexer disk for rotation about the second rotation axis; and a pointer mechanism disposed at the periphery of the indexer disk for releasable engagement with the plurality of grooves.

In some embodiments, the indexer disk includes an adapter surface configured for attachment to at least one of: a work piece holder; and an adapter base configured for attachment to a work piece holder.

Another general aspect of the invention is a method for adding a rotation axis to a multi-axis tooling machine having a single rotation axis. The method includes gripping a manufacturing fixture along the single rotation axis of the tooling machine, the manufacturing fixture being configured to support a work piece holder for providing rotation about a rotation axis of the manufacturing fixture, the rotation axis of the manufacturing fixture being perpendicular to the rotation axis of the multi-axis tooling machine. Thus, the gripping of the manufacturing fixture along the existing rotation axis adds a second rotation axis to the multi-axis tooling machine.

BRIEF DESCRIPTION OF THE DRAWINGS

FIG. 3 is a perspective view of one embodiment of an adapter base and corresponding work piece holder.

FIGS. 4 and 5 are top and bottom views, respectively, of one embodiment of the indexer disk.

DETAILED DESCRIPTION

Figure 1:
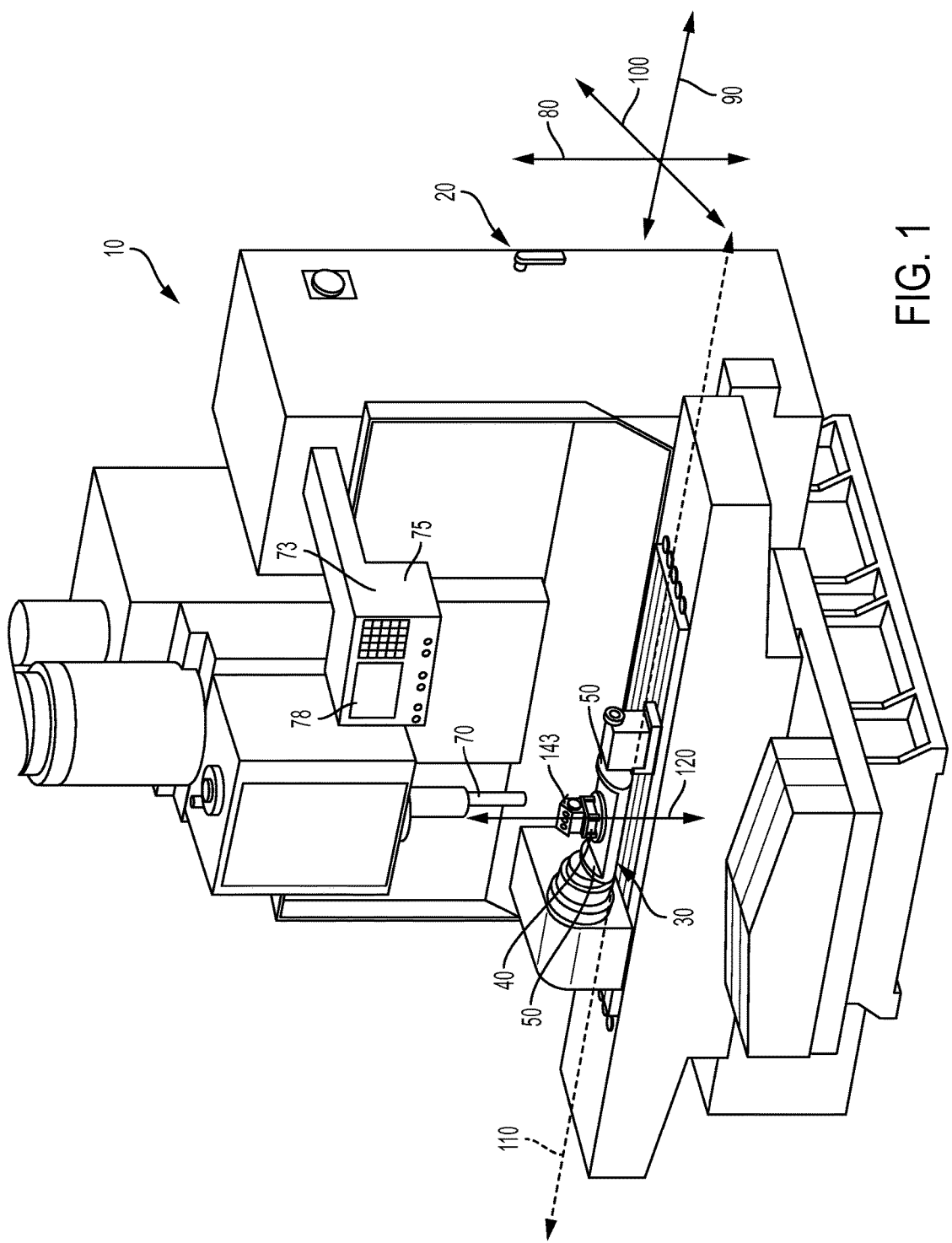
FIG. 1 is a perspective view of a machining system including a tooling machine and one embodiment of a manufacturing fixture for holding a work piece.

FIG. 1 shows a machining system 10 including a tooling machine 20 and a manufacturing fixture 30 holding a work piece 40. The manufacturing fixture 30 includes opposed sidewalls 50 that are gripped between inner edges of a vice of the tooling machine 20. A tool 70 is supported in the tooling machine 20. Relative motion between the tool 70 and work piece 40 is used to machine the work piece 40 into the desired form. Tool 70 may be any type of tool, such as a drill bit, a router bit, or the like, depending on the machining operations to be carried out on the work piece 40.

The tooling machine 20 can operate under numerical machine control using, for example, controller 73. Controller 73 can include a keyboard 75 and a screen 78 through which the machine operator programs and/or executes automated portions of the machining operations.

Figure 2:
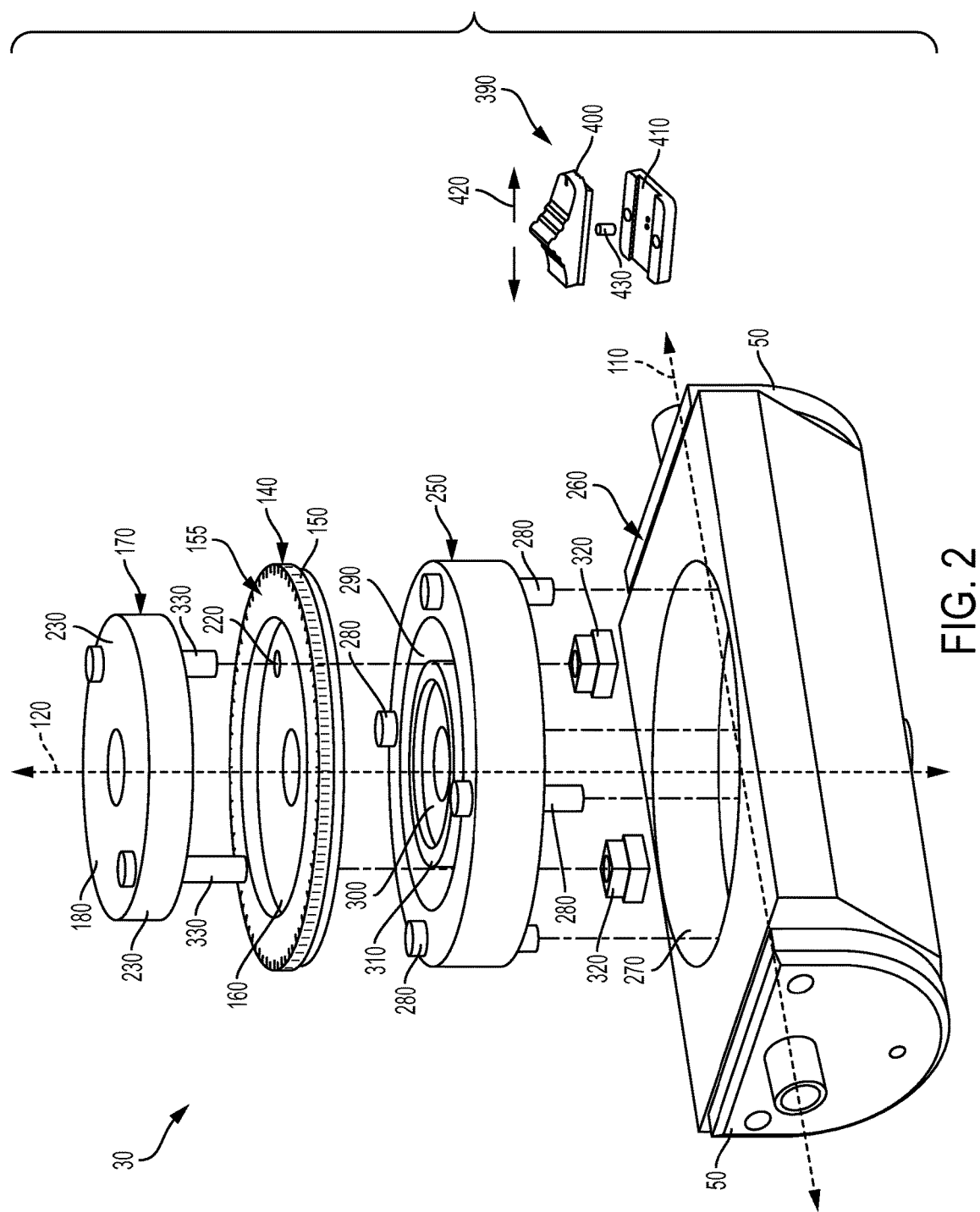
FIG. 2 is an exploded view of the components of one embodiment of the manufacturing fixture shown in FIG. 1.

In this example, the tooling machine 20 has three linear axes of motion in which the work piece 40 may be moved relative to tool 70 for machining. The axes include a vertical linear axis 80, a longitudinal linear axis 90, and a transverse linear axis 100. The tooling machine 20 also has a horizontal rotation axis 110 about which the manufacturing fixture 30 and corresponding work piece 40 can be rotated. When secured between the inner edges of the vice of the tooling machine 20, the manufacturing fixture 30 provides an additional independent rotation axis, shown generally at 120, defined at a central portion of an indexer disk 140 (FIG. 2). The additional independent rotation axis 120 is substantially perpendicular to the horizontal rotation axis 110. As a result, the manufacturing fixture 30 converts the original four-axis tooling machine 20 into a five-axis tooling machine. In the resulting five-axis machine, the manufacturing fixture 30 can be manually manipulated to adjust the angle at which the work piece 40 is machined relative to the additional independent rotation axis 120.

FIG. 2 is an exploded view of the components of one embodiment of the manufacturing fixture 30. In this embodiment, the manufacturing fixture 30 includes a base unit 260 configured for support by the tooling machine 20. The manufacturing fixture also includes an indexer disk 140 configured for support by the base unit 260. The indexer disk 140 includes an outer periphery 155 with a plurality of grooves 150 spaced at predetermined radial angles with respect to the rotation axis 120.

The indexer disk 140 may directly or indirectly (via adapter base 170) support a work piece holder 143 (FIG. 3). If the indexer disk 140 is configured to directly support the work piece holder 143, the upper surface 160 of the indexer disk 140 includes structures such as openings, flanges, grooves, bolts, bores, or the like, to secure the indexer disk 140 with the work piece holder 143. The specific structures are dependent on the particular type of work piece holder that is to be used with the manufacturing fixture 30. The upper surface 160 of the indexer disk 140 thus becomes an adapter surface for the work piece holder 143.

In the embodiment of FIG. 2, the upper surface 160 is not configured as an adapter surface. Instead, the upper surface 160 is configured to support an adapter base 170, which, in turn, has an upper surface 180 configured to support the work piece holder 143. More particularly, the upper surface 180 of the adapter base 170 includes structures such as openings, flanges, grooves, bolts, bores, or the like, used to secure the adapter base 170 with the work piece holder 143. In turn, the adapter base 170 is secured for co-rotation with the indexer disk 140 about rotation axis 120. Multiple adapter base types may be used to secure different types of work piece holders while using the same configuration of the indexer disk 140 and/or other components of the manufacturing fixture 30. In this manner, the manufacturing fixture 30 may accommodate different types of work piece holders merely by changing the adapter base 170 to the one suitable for the particular work piece holder. Different work piece holders may be used to support different work piece types for tooling.

One embodiment of an adapter base 170 and corresponding work piece holder 143 is shown in FIG. 3. Here, the work piece holder 143 is in the form of a vice having bores 190 disposed for alignment with corresponding bores 200 in the adapter base 170. Bolts or other securements are disposed through the bores 190 and 200 to fasten the work piece holder 143 for co-rotation with the adapter base 170. Additionally, or in the alternative, the work piece holder 143 may be in the form of a collet, dovetail part attachment, or the like.

FIGS. 4 and 5 are top and bottom views, respectively, of the indexer disk 140. As shown, the upper surface 160 includes an annular cavity 210 dimensioned to receive the adapter base 170. Openings 220 extend through the upper surface 160 and are aligned with corresponding openings 230 in the adapter base 170.

The grooves 150 at the outer periphery 155 of the indexer disk 140 may be in the form of teeth that are disposed at 1° increments with respect to rotation axis 120. Visual indicia 240 are disposed proximate to the teeth so as to identify the angle at which the work piece holder 143, and therefore the work piece 40, is oriented with respect to the rotation axis 120. Here, the visual indicia 240 (FIG. 4) are in the form of tick marks, where tick marks at 10° intervals are marked with numbers corresponding to radial angles 0° through 350°. Other teeth increments and corresponding visual indicia can also be used.

The manufacturing fixture 30 also includes a securement mechanism adjustable to a fixed state in which it prevents the indexer disk 140 from rotating about the rotation axis 120, and to a released state in which the securement mechanism releases the indexer disk 140 for rotation about the rotation axis 120. FIG. 2 illustrates one example of the components that may be used to execute this operation. In FIG. 2, the securement mechanism includes a keyed member 250 configured for fixed support by a base unit 260 at a position between the base unit 260 and the indexer disk 140. Here, the keyed member 250 is secured within an opening 270 of the base unit 260 using, for example, one or more bolts 280. Further, the keyed member has an arcuate groove 290 concentrically disposed about and radially displaced from the rotation axis 120. The arcuate groove 290 is defined at its interior by a central cylindrical portion 300 having an outwardly extending lip 310 disposed at least partially about, and preferably, completely about the central cylindrical portion 300. The arcuate groove 290 is also defined at its exterior by an inwardly extending lip 315 disposed at least partially about, and preferably, completely about the exterior of the arcuate groove 290.

The securement mechanism in the example of FIG. 2 also includes a key extending through the indexer disk 140 through the arcuate groove 290 into engagement with the keyed member 250. Here, the key includes one or more T-nuts 320 engaging one or more corresponding bolts 330, which extend through the openings 220, 230, and into the arcuate groove 290.

Figure 6:
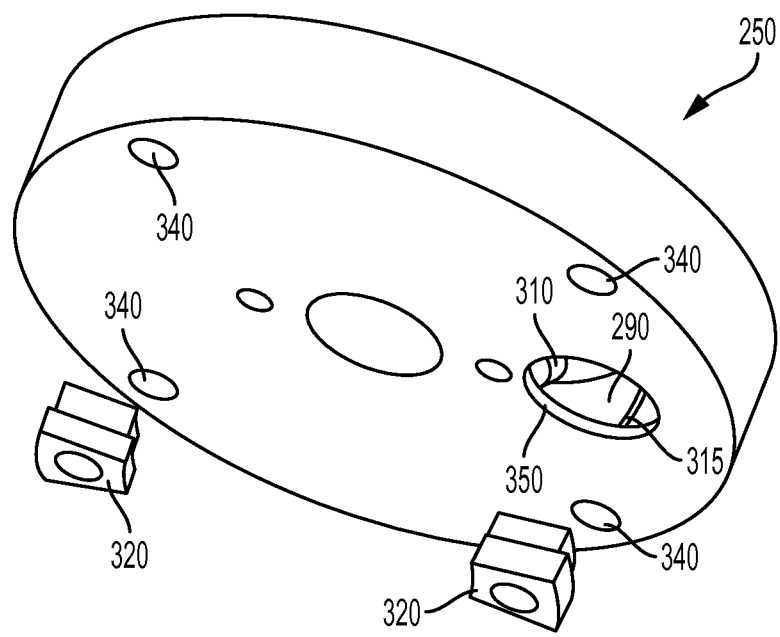
FIG. 6 is a perspective view of the underside of one embodiment of the keyed member as well as the T-nuts prior to placement of the T-nuts within the arcuate groove of the keyed member.

FIG. 6 is a perspective view of the underside of the keyed member 250 as well as the T-nuts 320 prior to placement of the T-nuts 320 within the arcuate groove 290 of the keyed member 250. As shown, the keyed member 250 includes a plurality of bores 340 through which the one or more bolts 280 proceed into engagement with the base unit 260.

Figure 7:
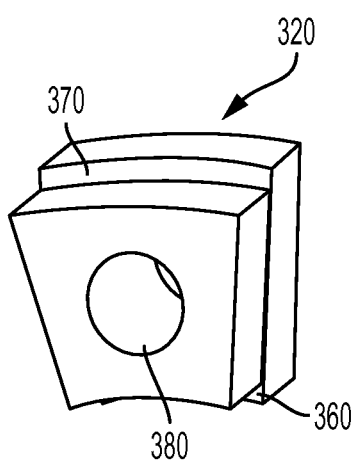
FIG. 7 is a perspective view of one embodiment of a T-nut.

Before securing the keyed member 250 to the base unit 260 with bolts 280, the T-nuts 320 are placed within the arcuate groove 290 through opening 350. Once present in the arcuate groove 290, the bolts 330 are loosely secured within the bores 380 of the T-nuts 320. In this state, the outwardly extending lip 310 and the inwardly extending lip 315 engage opposite sides of the T-nuts 320. More particularly, with reference to FIG. 7, each T-nut 320 includes an interior flange 360 configured to engage the outwardly extending lip 310, and an exterior flange 370 configured to engage the inwardly extending lip 315. Once engaged with the outwardly extending lip 310 and the inwardly extending lip 315, and absent tightening of bolt 330 (FIG. 2), the T-nut 320 is free to move about the circumference of the arcuate groove 290. Once the bolt 330 is tightened, however, the T-nut 320 is secured within the arcuate groove 290.

With reference again to FIG. 2, the manufacturing fixture 30 also includes a pointer mechanism 390 disposed at the outer periphery 155 of the indexer disk 140 for releasable engagement with the plurality of grooves 150. The pointer mechanism 390 includes a pointer 400 and a pointer base 410. The pointer base 410 is in fixed relationship with the base unit 260 in that it does not rotate with the indexer disk 140. The pointer 400 is movable on the pointer base 410 between a first position in which it is disengaged from the plurality of grooves 150 and a second position in which it is engaged with the plurality of grooves 150. Here, the movement is along a radial axis 420, which is generally perpendicular to the rotation axis 120. Releasable securement between the first and second positions is facilitated by a spring-loaded ball plunger 430.

Figure 8:
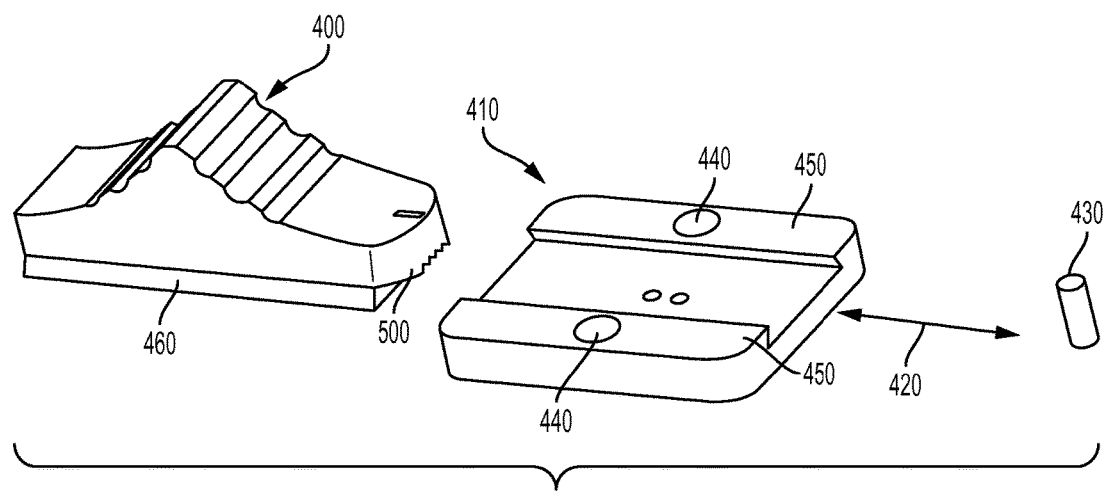
FIGS. 8 and 9 are perspective and side views, respectively, of exemplary components that can be used to form the pointer mechanism.
Figure 9:
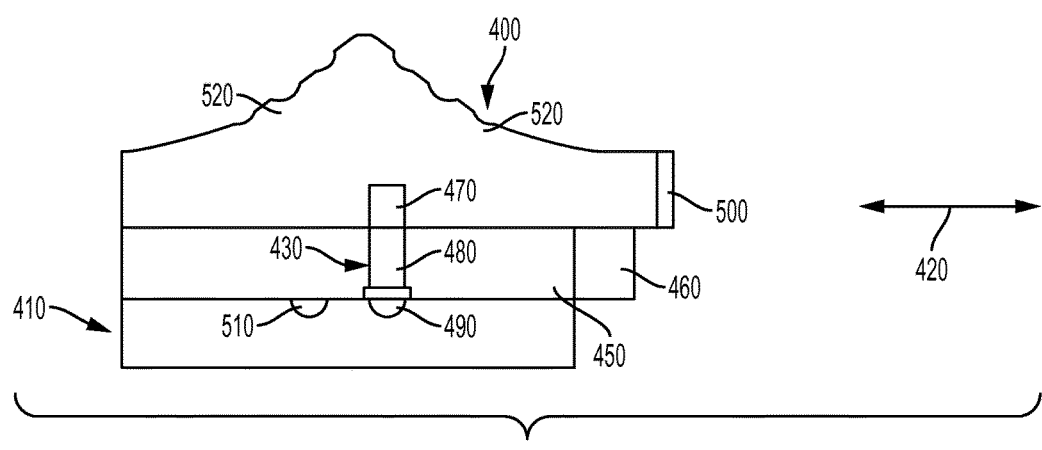

FIG. 8 and FIG. 9 show exemplary components that may be used to form the pointer mechanism 390 (FIG. 2). In this example, the pointer base 410 includes one or more bores 440 configured to accept fasteners that secure the pointer base 410 to the base unit 260. Flanged walls 450 extend from the sides of the pointer base 410 to engage corresponding flanged walls 460 of the pointer 400. This provides a dovetailed arrangement by which the pointer 400 may be moved along the radial axis 420.

The spring-loaded ball plunger 430 includes an upper portion 470 that inserts into an opening at the bottom of the pointer 400. The lower portion of the spring-loaded ball plunger 430 includes a spring-loaded ball 480 that engages a forward aperture 490 when the pointer 400 is moved to a position in which the teeth 500 make contact with the grooves 150. When the teeth 500 are to be removed from contact with the grooves 150, a manual force is applied to the pointer 400 along radial axis 420 to drive the spring-loaded ball 480 from engagement with the forward aperture 490. The force continues to be applied until the spring-loaded ball 480 engages a rear aperture 510 of the pointer base 410. While engaged with the rear aperture 510, the spring-loaded ball 480 holds the pointer 400 at a position in which the teeth 500 of the pointer 400 are maintained away from the grooves 150. When directed forward, the spring-loaded ball 480 disengages from the rear aperture 510 and again engages the forward aperture 490 thereby placing the pointer 400 at a position in which the teeth 500 are again held in contact with the grooves 150. The upper surface of the pointer 400 may include thumb-guides 520 to assist the user in applying the force necessary to move the pointer 400 between these positions.

Figure 10:
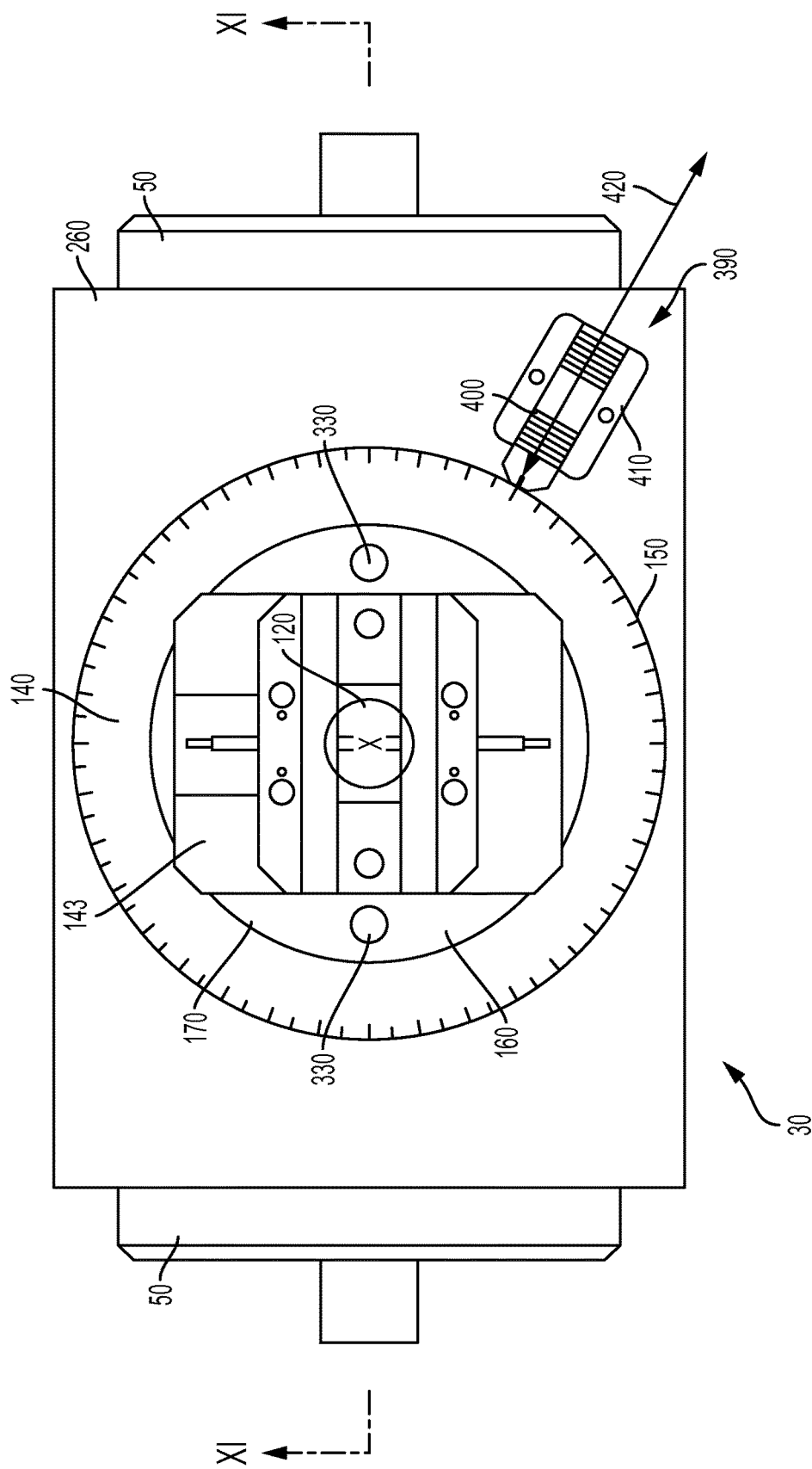
FIG. 10 is a top view of the manufacturing fixture in its assembled state.

FIG. 10 is a top view of the manufacturing fixture 30 of FIG. 2 in its assembled state.

Figure 11:
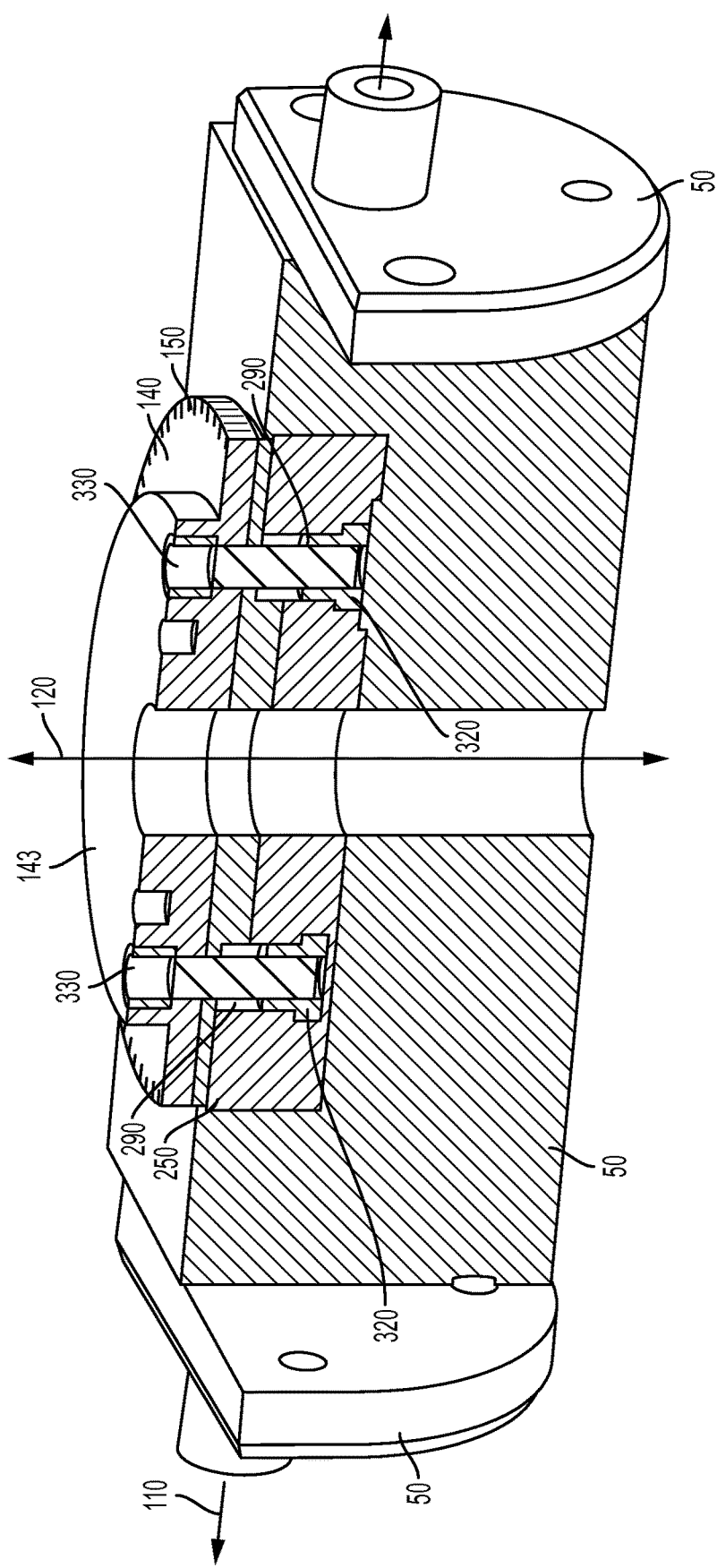
FIG. 11 is a cut away perspective view of the manufacturing fixture shown in FIG. 10 along line XI-XI.

FIG. 11 is a cut away view of the manufacturing fixture 30 shown in FIG. 10 along line XI-XI.

Figure 12:
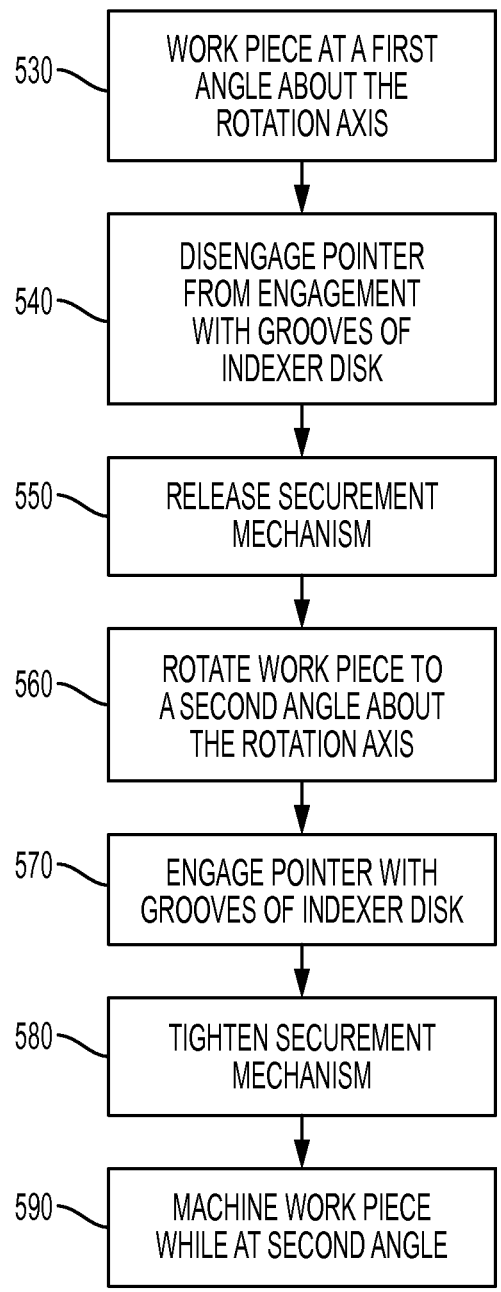
FIG. 12 is a flow chart showing one method that may be used to operate the manufacturing fixture.

FIG. 12 is a flow chart showing one method that may be used to operate the manufacturing fixture 30 shown in FIGS. 10 and 11. At operation 530, the work piece is held at a first angle about the rotation axis 120. In this position, the work piece holder 143, the adapter base 170, and the indexer disk 140 are secured to the base unit 260 at a fixed angle with respect to the rotation axis 120. This first angle is identified using the visual indicia 240 disposed adjacent to the teeth 500 of the pointer 400.

At operation 540, the pointer 400 is driven outward along radial axis 420 until the spring-loaded ball 480 engages the rear aperture 510. In this position, the teeth 500 of the pointer 400 are disengaged from the grooves 150 at the outer periphery 155 of the indexer disk 140.

At operation 550, with the teeth 500 disengaged from the grooves 150, the securement mechanism is loosened to allow the work piece, the work piece holder 143, the adapter base 170, and the indexer disk 140 to co-rotate about the rotation axis 120. In this example, the bolts 330 are at least partially loosened from the corresponding t-nuts 320 to allow the bolts 330 and T-nuts 320 to move about the arcuate groove 290 of the keyed member 250.

At operation 560, the work piece is rotated to a second angle with respect to the rotation axis 120. This is done by rotating the indexer disk 140 until the visual indicia 240 identifying the desired second angle is aligned with the pointer 400.

At operation 570, with the work piece rotated to the second angle, the pointer 400 is driven inward along radial axis 420 until the spring-loaded ball 480 disengages from the rear aperture 510 and engages the forward aperture 490. In this position, the teeth 500 of the pointer 400 are once again engaged with the grooves 150 at the outer periphery 155 of the indexer disk 140.

At operation 580, with the teeth 500 engaged with the grooves 150, the securement mechanism is tightened to secure the work piece, the work piece holder 143, the adapter base 170, and the indexer disk 140 against rotation about the rotation axis 120. In this example, the bolts 330 are tightened to the corresponding t-nuts 320 to prevent the bolts 330 and T-nuts 320 from moving about the arcuate groove 290 of the keyed member 250.

At operation 590, machining of the work piece begins and/or continues with the work piece held at the second angle. Throughout the machining process, the manufacturing fixture 30 may be adjusted to hold the work piece at various angles about the rotation axis 120. The adjustments may be made without moving the work piece from the work piece holder 143 thereby reducing the likelihood of misalignment of the work piece as well as reducing the amount of time needed to adjust the position of the work piece throughout the machining cycle.

It will be appreciated that the foregoing disclosure provides examples of at least one system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. An apparatus for adding a rotation axis to a multi-axis tooling machine, the apparatus comprising:
   a base unit configured for attachment to an existing movable axis of the multi-axis tooling machine;
   an indexer disk configured for support by the base unit, the indexer disk including a rotation axis and an upper annulus having an outer periphery having a plurality of grooves spaced at predetermined radial angles with respect to the rotation axis, the upper annulus having an upper surface with visual indicia immediately adjacent the plurality of grooves, wherein the visual indicia identify the predetermined radial angles of the plurality of grooves with respect to the rotation axis;
   a securement mechanism extending through and accessible at a top surface of the upper annulus, the securement mechanism being adjustable to one of a fixed state in which the indexer disk is vertically clamped with respect to the base unit to prevent the indexer disk from rotating about the rotation axis, and a released state in which vertical clamping between the indexer disk with respect to the base unit is reduced to allow the indexer disk to rotate about the rotation axis to the predetermined radial angles; and a pointer mechanism disposed immediately adjacent the outer periphery of the upper annulus of the indexer disk, the pointer mechanism including a tip for releasable engagement with the plurality of grooves, the tip having an alignment mark, wherein the pointer mechanism is radially movable with respect to the indexer disk between a released position in which the indexer disk is rotatable about the rotation axis while the securement mechanism is in the released state, and an engaged position in which the tip of the pointer mechanism engages one or more of the plurality of grooves to maintain the indexer disk at one of the predetermined radial angles while the securement mechanism is adjusted to the fixed state, wherein the predetermined radial angle at which the work piece is supported about the rotation axis is identified by alignment of the visual indicia adjacent the plurality of grooves with the alignment mark of the pointer mechanism, wherein the alignment mark and visual indicia are visible to a user as the user rotates the indexer disk between the predetermined radial angles.

2. The apparatus of claim 1, further comprising:
an adapter base configured for support by the indexer disk, the adapter base also being configured for attachment to a work piece holder.

3. The apparatus of claim 1, wherein the indexer disk includes an adapter surface configured for attachment to a work piece holder.

4. The apparatus of claim 1, wherein the pointer mechanism comprises:
a pointer; and
a pointer base in a fixed relationship with the base unit, the pointer being movable on the pointer base between a first position in which it is disengaged from the plurality of grooves, and a second position in which it is in fixed engagement with one or more of the plurality of grooves.

5. The apparatus of claim 4, wherein the plurality of grooves of the indexer disk are formed as teeth.

6. The apparatus of claim 5, wherein the tip is configured to selectively engage one or more of the teeth of the indexer disk.

7. The apparatus of claim 4, wherein the pointer is movable with respect to the pointer base along a radial axis that is perpendicular to the rotation axis.

8. The apparatus of claim 1, wherein the securement mechanism comprises:
a keyed member configured for fixed support by the base unit at a position between the base unit and the indexer disk, the keyed member having an arcuate groove concentrically disposed about and radially displaced from the rotation axis; and
a key extending through the indexer disk and into the engagement with the keyed member through the arcuate groove, wherein the key is adjustable with respect to the keyed member to implement the fixed state and released state.

9. The apparatus of claim 8, wherein the key is a T-nut engaging a bolt extending through the indexer disk and arcuate groove of the keyed member.

10. The apparatus of claim 1, wherein the plurality of grooves are disposed completely about the periphery of the indexer disk.

11. The apparatus of claim 10, wherein the plurality of grooves are disposed at 1° increments about the periphery of the indexer disk.

12. The apparatus of claim 1, wherein the base unit includes sidewalls configured for gripping by a vice of the multi-axis tooling machine.

13. The apparatus of claim 12, wherein the multi-axis tooling machine is a four-axis tooling machine, and the additional rotation axis is a fifth axis of the multi-axis tooling machine.

14. An apparatus for use in a multi-axis tooling machine to add a rotation axis, the apparatus comprising:
an indexer disk having a central portion defining a rotation axis, the indexer disk having an upper annulus having an outer periphery with a plurality of grooves spaced at predetermined radial angles with respect to the rotation axis, the upper annulus having an upper surface with visual indicia immediately adjacent the plurality of grooves, wherein the visual indicia identify the predetermined radial angles of the plurality of grooves;
an adapter base having a first side disposed adjacent to a central portion of the indexer disk, and a second side configured to engage a work piece holder;
a keyed member having an arcuate groove concentrically disposed about and radially displaced from the rotation axis; and
a key extending vertically through the adapter base, indexer disk, and arcuate groove of the keyed member, wherein the key is adjustable with respect to the keyed member between a fixed state in which the indexer disk and adapter base are vertically clamped between the key and keyed member within the arcuate groove against movement about the rotation axis, and a released state in which the indexer disk and adapter base are released for co-rotation about the rotation axis as the key rotates within the arcuate groove of the keyed member;
a pointer mechanism disposed immediately adjacent the outer periphery of the upper annulus of the indexer disk, the pointer mechanism including a tip for releasable engagement with the plurality of grooves, the tip having an alignment mark, wherein the pointer mechanism is radially movable with respect to the indexer disk between a released position in which the indexer disk is rotatable about the rotation axis while the key is in the released state, and an engaged position in which the tip of the pointer mechanism engages one or more of the plurality of grooves to maintain the indexer disk at one of the predetermined radial angles while the key is adjusted to the fixed state, wherein the predetermined radial angle at which the work piece is supported about the rotation axis is identified by alignment of the visual indicia adjacent the plurality of grooves with the alignment mark of the pointer mechanism, wherein the alignment mark and visual indicia are visible to a user as the user rotates the indexer disk between the predetermined radial angles; and
a base unit in fixed engagement with the keyed member, wherein the base unit is configured for support by an existing axis of the tooling machine.

15. The apparatus of claim 14, wherein the key comprises a T-nut engaging a bolt extending through the adapter base, indexer disk, and arcuate groove of the keyed member.

16. The apparatus of claim 14, wherein the pointer mechanism comprises:
a pointer; and
a pointer base in a fixed relationship with the base unit, wherein the pointer is movable on the pointer base between a first position in which it is disengaged from the plurality of grooves, and a second position in which it is in fixed engagement with at least one of the plurality of grooves.

17. The apparatus of claim 16, wherein the plurality of grooves of the indexer disk are formed as teeth, and wherein the tip is configured to selectively engage one or more of the teeth of the indexer disk.

18. The apparatus of claim 16, wherein the pointer is movable with respect to the pointer base along a radial axis that is perpendicular to the rotation axis.

* * * * *